(12) United States Patent
Gaenz

(10) Patent No.: US 10,239,710 B2
(45) Date of Patent: Mar. 26, 2019

(54) METHOD AND DEVICE FOR LOADING A PALLET

(71) Applicant: ATLANTIC C HANDELS—UND BERATUNGS GMBH, Bernkastel-Kues (DE)

(72) Inventor: Rolf Gaenz, Bernkastel-Kues (DE)

(73) Assignee: ATLANTIC C Handels—und Beratungs GmbH, Bernkastel-Kues (DE)

( * ) Notice: Subject to any disclaimer, the term of this patent is extended or adjusted under 35 U.S.C. 154(b) by 427 days.

(21) Appl. No.: 14/874,640

(22) Filed: Oct. 5, 2015

(65) Prior Publication Data

US 2016/0023853 A1 Jan. 28, 2016

Related U.S. Application Data

(63) Continuation of application No. PCT/EP2014/000826, filed on Mar. 27, 2014.

(30) Foreign Application Priority Data

Apr. 4, 2013 (DE) .......................... 10 2013 005 615

(51) Int. Cl.
*B65G 1/04* (2006.01)
*B65G 49/08* (2006.01)
(Continued)

(52) U.S. Cl.
CPC ......... *B65G 63/002* (2013.01); *B65G 1/0485* (2013.01); *B65G 1/1373* (2013.01);
(Continued)

(58) Field of Classification Search
CPC .... B65G 1/1378; B65G 1/0407; B65G 1/133; B65G 1/1375; B65G 65/00
See application file for complete search history.

(56) References Cited

U.S. PATENT DOCUMENTS 2,718,972 A * 9/1955 Temple .................. B65G 65/00
198/575
3,379,321 A 4/1968 Weir
(Continued)

FOREIGN PATENT DOCUMENTS

DE 3417736 A1 11/1985
DE 4114215 A1 11/1992
(Continued)

*Primary Examiner* — Gregory W Adams
(74) *Attorney, Agent, or Firm* — Laurence A. Greenberg; Werner H. Stemer; Ralph E. Locher

(57) ABSTRACT

A method for loading a pallet with different individual packs of a picked order includes a first method step in which the individual packs to be palletized are delivered in a conveyor cart, a second method step in which the individual packs are separated, positioned and prepared for palletizing in such a way that a palletizing station has access to all of the individual packs and a third method step in which the individual packs are picked in a sequence predetermined by the palletizing station and stacked on the pallet. A device for performing the method includes one or more palletizing stations with a storage device for the individual packs and with a continuous conveying loop acting as a conveying path for the conveyor cart.

7 Claims, 3 Drawing Sheets

(51) Int. Cl.
  *B65G 49/05* (2006.01)
  *B65G 63/00* (2006.01)
  *B65G 61/00* (2006.01)
  *B65G 1/137* (2006.01)
  *B65G 47/90* (2006.01)
(52) U.S. Cl.
  CPC ........... *B65G 1/1375* (2013.01); *B65G 47/90* (2013.01); *B65G 49/085* (2013.01); *B65G 61/00* (2013.01); *B65G 2209/06* (2013.01)

(56) References Cited

U.S. PATENT DOCUMENTS

| | | | | |
|---|---|---|---|---|
| 3,448,870 A | * | 6/1969 | Boissevain | B65G 1/1378 198/349 |
| 3,661,284 A | * | 5/1972 | Traube | B65G 1/1378 186/69 |
| 3,889,797 A | | 6/1975 | Naito et al. | |
| 4,422,554 A | * | 12/1983 | Lichti | B65G 1/133 198/833 |
| 4,492,504 A | * | 1/1985 | Hainsworth | B66F 9/07 414/273 |
| 4,615,429 A | * | 10/1986 | Arase | B65G 47/244 198/456 |
| 4,678,390 A | * | 7/1987 | Bonneton | B65G 1/1375 294/4 |
| 5,156,514 A | * | 10/1992 | Zah | B65G 1/0442 414/278 |
| 5,228,820 A | * | 7/1993 | Stansfield | B65G 1/0407 414/274 |
| 5,337,880 A | * | 8/1994 | Claycomb | B65G 47/5181 198/347.3 |
| 5,348,440 A | | 9/1994 | Focke | |
| 5,411,151 A | * | 5/1995 | Sasada | B65G 1/1373 209/583 |
| 5,473,545 A | * | 12/1995 | Schausten | B65G 1/1371 414/273 |
| 5,501,571 A | | 3/1996 | Van Durrett et al. | |
| 5,547,329 A | * | 8/1996 | Hirai | C12M 23/48 198/347.1 |
| 5,588,790 A | * | 12/1996 | Lichti | B65G 1/133 198/333 |
| 5,964,562 A | * | 10/1999 | Bernard, II | B65G 1/045 198/347.3 |
| 6,325,586 B1 | * | 12/2001 | Loy | B65G 1/02 414/281 |
| 7,210,894 B2 | * | 5/2007 | Huang | B65G 47/90 414/21 |
| 7,266,422 B1 | | 9/2007 | Demotte et al. | |
| 7,894,932 B2 | * | 2/2011 | Mountz | G06Q 10/087 700/214 |
| 7,991,506 B2 | * | 8/2011 | Schafer | B65G 1/1378 414/273 |
| 8,202,035 B2 | * | 6/2012 | Safir | B65G 67/02 414/347 |
| 8,397,897 B2 | | 3/2013 | Bastian, II et al. | |
| 8,423,178 B2 | | 4/2013 | Baumann | |
| 8,583,277 B2 | | 11/2013 | Kuehnemann et al. | |
| 2007/0280814 A1 | | 12/2007 | Morency et al. | |
| 2007/0297879 A1 | * | 12/2007 | Yuyama | A61G 12/001 414/279 |
| 2008/0046116 A1 | * | 2/2008 | Khan | B25J 9/1687 700/230 |
| 2008/0267759 A1 | | 10/2008 | Morency et al. | |
| 2009/0324378 A1 | * | 12/2009 | Schafer | B65G 1/1378 414/795.9 |
| 2010/0178149 A1 | | 7/2010 | Fritzsche | |
| 2014/0088748 A1 | | 3/2014 | Woodtli et al. | |

FOREIGN PATENT DOCUMENTS

| | | |
|---|---|---|
| DE | 4338801 A1 | 5/1995 |
| DE | 19848274 A1 | 5/2000 |
| DE | 19911144 A1 | 9/2000 |
| DE | 19931756 A1 | 1/2001 |
| DE | 102007016727 A1 | 10/2008 |
| DE | 102009011294 A1 | 9/2010 |
| EP | 2330060 A1 | 6/2011 |
| WO | 2008068264 A1 | 6/2008 |
| WO | 2012156355 A1 | 11/2012 |

\* cited by examiner

METHOD AND DEVICE FOR LOADING A PALLET

CROSS-REFERENCE TO RELATED APPLICATION

This is a continuation, under 35 U.S.C. § 120, of copending International Application PCT/EP2014/000826, filed Mar. 27, 2014, which designated the United States; this application also claims the priority, under 35 U.S.C. § 119, of German Patent Application DE 10 2013 005 615.2, filed Apr. 4, 2013; the prior applications are herewith incorporated by reference in their entirety.

BACKGROUND OF THE INVENTION

Field of the Invention

The present invention relates to a method for loading a pallet having various individual packs or packages of a picked order or partial order or a plurality of orders, and to a device for carrying out the method.

In its basic concept, the method is composed of three method steps. In the first method step the individual packs of an associated batch are supplied in a conveying device, for example a conveyor cart. A batch represents that amount of individual packs that is to be palletized in one operation. A batch is composed of different kinds of individual packs. The amount and composition of the individual packs may be identical with the composition of an individual order which is to be packed on one pallet. However, it is likewise also possible that a batch relates to only part of an order. The entire order then is assembled from a plurality of batches or partial orders. It is also possible for a batch to include a plurality of comparatively small individual orders. In the context of the invention a batch is thus always that amount of individual packs that is to be loaded onto the respective pallet in one palletizing operation. The individual packs to be stacked on one pallet in this case may be distributed across a plurality of conveying devices. It is also possible for an order to be composed of a plurality of pallets, so that the pallet to be loaded then only includes a partial order. A pallet may also be composed of a plurality of order parts, so-called batches. A plurality of orders may also be combined on one pallet.

In the second method step the individual packs are singularized, positioned in relation to the outer edges, and marshaled or assembled. A palletizing station or installation, preferably a palletizing robot, can access the individual packs which have thus been assembled in a singularized manner and position the individual packs in a defined manner on a pallet. The individual packs in this case are assembled in such a way that the palletizing robot may at all times access each individual pack in any arbitrary sequence.

In a third and last method step the individual packs are picked up in the required sequence by the palletizing station, preferably by the palletizing robot, and are stacked on the pallet.

Advantageously the individual packs are singularized on backlog-minimizing conveyors, preferably on accumulating roller conveyors having obliquely positioned accumulating rollers. This has the advantage that the individual packs which are sequenced behind one another are conveyed to a periphery of the accumulating roller conveyor and are aligned along the side wall of this periphery in a quasi self-acting manner in that the individual packs by way of an outer edge bear on the side wall of the conveyor.

In order for the method to be carried out, a device having at least one conveying device is provided. The conveying device removes the respective individual packs from one or a plurality of removal conveyors of a storage device, and conveys the individual packs to the palletizing station. The individual packs have to be singularized prior to palletizing. To this end, it is possible in one simple variant of the method for a conveyor cart to be employed as a conveying device, and for the conveyor cart to be equipped with compartments which are disposed on top of one another, and for in each case only one individual pack to be placed in each compartment. The entire conveyor cart may be emptied and used as an intermediate storage device.

However, it is much more advantageous to have a plurality of respective conveying devices or conveyor carts continuously and repeatedly moving past a plurality of respective removal conveyors or devices for singularizing the individual packs in a continuous conveying loop.

A method of that type and similar devices are known from International Publication WO 2012/156355 A1, corresponding to U.S. Patent Application Publication US 2014/0088748 A1, and from International Publication WO 2008/068264 A1. International Publication WO 2012/156355 A1, corresponding to U.S. Patent Application Publication US 2014/0088748 A1, already discloses palletizing stations having storage units and a continuous conveying loop having a plurality of conveying devices.

SUMMARY OF THE INVENTION

It is accordingly an object of the invention to provide a method and a device for loading a pallet, which overcome the hereinafore-mentioned disadvantages of the heretofore-known methods and devices of this general type and which are improved in terms of providing individual packs to be palletized.

With the foregoing and other objects in view there is provided, in accordance with the invention, a method for loading a pallet having different kinds of individual packs. In a first method step the individual packs to be palletized are supplied in conveying carts. In a second method step the individual packs are stored in an assembly storage device having a plurality of levels which are disposed on top of one another and assembled for palletizing in such a manner that a palletizing station has access to all individual packs. In a third method step the individual packs are picked up in a sequence which is predefined by the palletizing station and are stacked on the pallet.

With the objects of the invention in view, there is also provided a device for carrying out the method, including one or a plurality of conveying carts which receive the individual packs, one or a plurality of palletizing stations having storage devices for the individual packs, and an endless conveying loop acting as a conveying path for the conveyor cart between a plurality of removal conveyors of a storage unit for receiving individual packs and a palletizing station for discharging and storing the individual packs. An assembly storage device has a plurality of storage components disposed on top of one another for receiving and assembling the individual packs.

According to the invention, the individual packs are stored in an assembly storage device having a plurality of levels which are disposed on top of one another. These levels may be disposed in a grandstand style or be disposed in the manner of respective terraces, so that the palletizing robot may reach all individual packs of one batch (or order part). In another embodiment, these individual levels which are disposed on top of one another are constructed in the manner of drawers. The individual packs in the drawers in turn are preferably positioned relative to the outer edges. During palletizing it is in each case that drawer from which the respective individual pack is picked that is opened.

In another advantageous structural embodiment the storage compartments of the assembly storage device, in order to marshal or assemble individual packs for removal by the palletizing robot, are constructed in the manner of drawers. An intermediate storage device is advantageously disposed upstream of each assembly storage device. The intermediate storage device can receive the contents of a conveyor cart and discharge those contents to the downstream assembly storage device in one move.

Finally, it is advantageous to provide a plurality of conveyor belts at the removal conveyors of the storage unit which conveyor belts run on top of and beside one another, in order to simultaneously feed-in a plurality of individual packs to storage compartments of the conveyor cart which are likewise disposed on top of and beside one another.

In one advantageous structural embodiment the conveying devices are implemented as suspensions in a monorail suspension trackway. An endless loop, also referred to as a loop, is particularly easy to implement by way of a monorail suspension trackway. Moreover, a monorail suspension trackway does not require any floor space. It is advantageous for a plurality of storage compartments to be provided beside and on top of one another in the suspension. As an alternative to a monorail suspension trackway, driverless floor conveying vehicles may also be employed as conveying devices.

If and when an accumulating roller conveyor is provided for singularizing the individual packs, the compartments in the conveying device or suspension may be serviced in a quasi level-by-level fashion. If and when an assembly storage device having a plurality of storage compartments, which are disposed beside and on top of one another is used, the storage compartments may be directly and at best simultaneously filled from the conveyor cart.

Other features which are considered as characteristic for the invention are set forth in the appended claims.

Although the invention is illustrated and described herein as embodied in a method and a device for loading a pallet, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
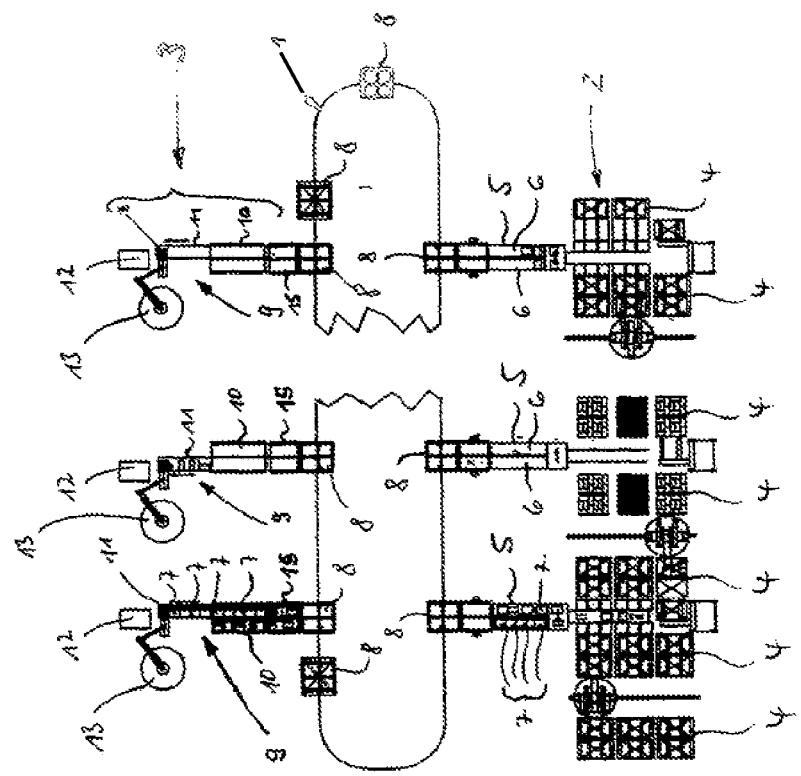
FIG. 1 is a fragmentary, diagrammatic, top-plan view of an automated storage unit having seven illustrated shelf rows and three illustrated removal conveyors, plus a continuous conveying loop and a assembly storage device having storage compartments which are constructed in the manner of drawers.

Referring now to the figures of the drawings in detail and first, particularly, to FIG. 1 thereof, there is seen a conveying loop 1. The conveying loop 1 connects a storage unit 2 with a palletizing region 3. The storage unit 2 is composed of a plurality of shelf rows 4 which are disposed beside one another. Removal conveyors 5 convey individual packs or packages 7 out of the shelf rows 4. The removal conveyors 5 in each conveying level have two conveyor belts 6 which are disposed beside one another. The individual packs 7 are fed into conveyor carts 8 with the aid of the conveyor belts 6. It can be seen from the illustration of FIG. 1 that a plurality of conveyor carts 8 may be in active operation in the conveying loop 1.

When feeding in the individual packs 7, the conveyor carts 8 pass the individual removal conveyors 5 in sequence and receive the individual packs 7 which belong to one partial order or order. As soon as the individual packs 7 of a partial order or order in the required number have been fed into the conveyor cart 8, the conveyor cart 8 runs to one of three illustrated palletizing stations 9 in the palletizing region 3, so as to discharge the individual packs 7 there. An intermediate storage device 15 receives the individual packs 7 in the palletizing station 9. The intermediate storage device 15 is sized in such a way that it may receive all individual packs 7 of one conveyor cart 8, that is to say a batch.

The intermediate storage device 15 in turn discharges its contents, that is to say the stored batch, in one move to an assembly storage device 10 that is in each case assigned to the former. The assembly storage device 10 in this case has storage compartments which are configured in the manner of drawers 11. In order for pallets 12 to be loaded with the individual packs 7, a palletizing robot 13 acquires the respective individual packs 7 from the drawers 11, so as to place them onto the pallet 12.

Figure 2:
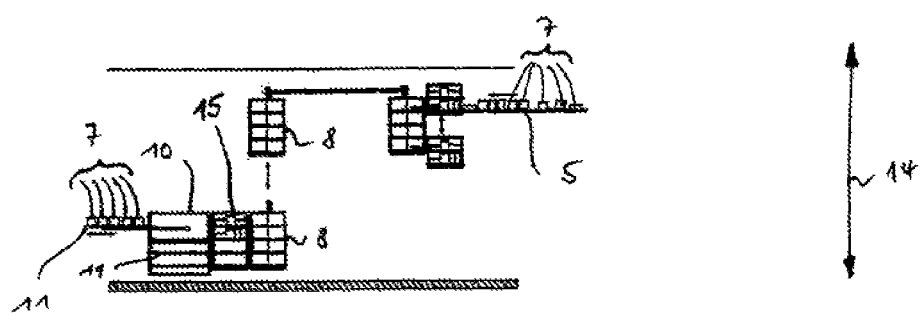
FIG. 2 is a cross-sectional view of the illustration of FIG. 1, having two conveyor carts, wherein a first conveyor cart is being filled by a removal conveyor of a storage unit, and a second conveyor cart is discharging individual packs to a assembly storage device having storage compartments which are constructed in the manner of drawers.
Figure 3:
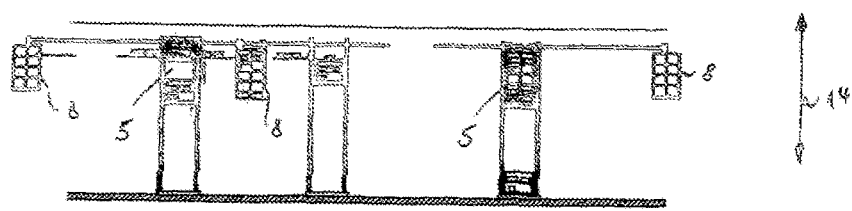
FIG. 3 is a side-elevational view of conveyor carts which are constructed as a suspension of a monorail suspension trackway and which are passing the removal conveyors of a storage unit.
Figure 4:
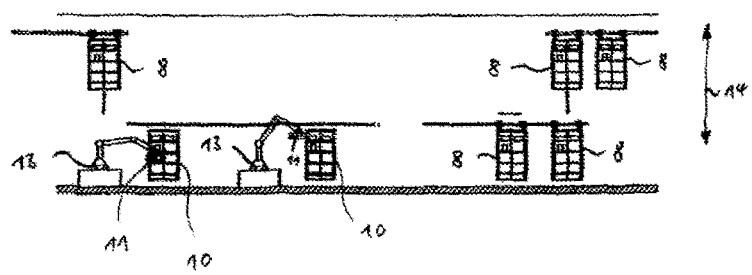
FIG. 4 is a side-elevational view of palletizing robots which are constructed as articulated-arm robots and which are removing individual packs from a assembly storage device having storage compartments which are constructed in the manner of drawers.

An assembly storage device 10 having a drawer 11 with individual packs 7 bearing thereon is shown again in FIG. 2. Again, the intermediate storage device 15 is disposed upstream of the assembly storage device 10. Furthermore, a conveyor cart 8 is shown. The conveyor cart 8 is displaceable for height in the vertical direction 14 as seen in FIGS. 2, 3 and 4. This displaceability serves for overcoming a height differential between the conveying loop 1, which is remote from the floor, and the palletizing station 9, which is close to the floor. The conveyor cart 8 feeds the intermediate storage device 15 which in turn fills the assembly storage device 10. It can also be seen in the illustration of FIG. 2 that the conveyor cart 8 has a plurality of storage compartments which are disposed on top of and beside one another. The assembly storage device 10 likewise has a plurality of drawers 11 which are disposed on top of and beside one another.

The removal conveyors 5 preferably have a number of conveyor belts 6 which are disposed beside one another and in terms of their number correspond to the number of storage compartments which are disposed beside one another in the conveyor cart 8. In turn, the number of the levels of conveyor belts 6 in the removal conveyer 5 that are disposed on top of one another advantageously corresponds to the number of pairs of storage compartments which are disposed on top of one another in the conveyor cart 8. The conveyor carts 8 may be very rapidly filled with the individual packs 7 in this way.

The invention claimed is:

1. A method for loading a pallet with different kinds of individual packs, the method comprising the following steps:
    in a first method step supplying the individual packs to be palletized in a conveying device;
    in a second method step storing the individual packs in an assembly storage device having drawers in a plurality of levels disposed on top of one another and assembling the individual packs for palletizing by picking the individual packs from the drawers while the drawers are open and allowing a palletizing station to have access to all of the individual packs;
    in a third method step picking up the individual packs in a sequence predefined by the palletizing station and stacking the individual packs on the pallet;
    singularizing and positioning the individual packs in the second method step; and
    positioning the individual packs relative to outer edges of the individual packs by sequencing the individual packs behind one another on an accumulating roller conveyor having obliquely disposed accumulating rollers.

2. The method according to claim 1, which further comprises positioning the individual packs by outer edges of the individual packs.

3. The method according to claim 1, which further comprises displacing the drawers in the levels of the assembly storage device to enable individual access to each individual pack during palletizing.

4. A device for loading a pallet with different kinds of individual packs, the device comprising:
    a storage unit for receiving the individual packs;
    a plurality of removal conveyors for removing the individual packs from said storage unit;
    at least one palletizing station having storage devices for discharging and storing the individual packs, said at least one palletizing station picking up the individual packs in a sequence predefined by said at least one palletizing station;
    an assembly storage device having a plurality of storage components constructed as drawers disposed on top of one another for receiving and assembling the individual packs from said at least one a palletizing station; and
    an endless conveying loop having at least one conveyor cart receiving the individual packs and following a conveying path between said plurality of removal conveyors and said at least one palletizing station.

5. The device according to claim 4, wherein said storage devices of said at least one palletizing station are intermediate storage devices disposed upstream of said assembly storage device.

6. The device according to claim 4, wherein said at least one conveyor cart has a plurality of storage compartments and said plurality of storage compartments of said at least one conveyor cart and said drawers are disposed beside and on top of one another for receiving and assembling the individual packs.

7. The device according to claim 4, which further comprises an accumulating roller conveyor having obliquely disposed rollers for assembling the individual packs at said at least one palletizing station.

* * * * *